(12) United States Patent
Shinozaki et al.

(10) Patent No.: US 8,587,678 B2
(45) Date of Patent: Nov. 19, 2013

(54) HEAD-SEPARATED CAMERA DEVICE WITH SWITCHABLE CLOCKING

(75) Inventors: Hiroshi Shinozaki, Ome-shi (JP); Masatoshi Ookubo, Iruma (JP); Hiroyuki Irikura, Ome (JP); Takashi Tsuda, Ome (JP); Koichi Mitsuo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 13 days.

(21) Appl. No.: 13/565,634

(22) Filed: Aug. 2, 2012

(65) Prior Publication Data

US 2012/0293676 A1    Nov. 22, 2012

Related U.S. Application Data

(63) Continuation of application No. 12/797,297, filed on Jun. 9, 2010, now abandoned.

(30) Foreign Application Priority Data

Jul. 15, 2009  (JP) .................................. 2009-167085

(51) Int. Cl.
*H04N 7/14*    (2006.01)
*H04N 5/232*   (2006.01)

(52) U.S. Cl.
USPC ................ 348/211.14; 348/211.1; 348/211.5; 348/14.05

(58) Field of Classification Search
USPC .......................... 348/138, 537, E7.02, E7.021, 348/211.1–211.99, 14.05
See application file for complete search history.

(56) References Cited

U.S. PATENT DOCUMENTS

| | | | | |
|---|---|---|---|---|
| 6,429,901 B1* | 8/2002 | Kiyose et al. | ................. | 348/500 |
| 6,631,432 B1* | 10/2003 | Yamagishi | .................... | 710/107 |
| 6,760,062 B2* | 7/2004 | Ostromek et al. | ....... | 348/211.11 |
| 7,046,298 B2* | 5/2006 | Kuzumoto et al. | ........... | 348/465 |
| 7,602,419 B2* | 10/2009 | Kiuchi | ....................... | 348/211.1 |

(Continued)

FOREIGN PATENT DOCUMENTS

| | | |
|---|---|---|
| JP | 07-322118 | 12/1995 |
| JP | 09-294223 | 11/1997 |

(Continued)

OTHER PUBLICATIONS

Japanese Patent Application No. 2009-167085, Notice of Reasons for Rejection, mailed Aug. 10, 2010, (with English Translation).

(Continued)

*Primary Examiner* — Chia-Wei A Chen
(74) *Attorney, Agent, or Firm* — Blakely, Sokoloff, Taylor & Zafman LLP

(57) ABSTRACT

According to one embodiment, a head-separated camera device includes an imaging unit, a control unit configured to control the imaging unit and a connection unit configured to connect the imaging unit and the control unit. The imaging unit includes a sensor configured to capture an image to provide a video signal, a superimposition module configured to superimpose, on serial data, the video signal, the synchronization signal, and the clock signal, the serial data serving to reproduce the image captured by the sensor, and a transmitter configured to transmit the serial data to the control unit. The control unit includes a receiver configured to receive the serial data and a separation module configured to separate the serial data received by the receiver, into the video signal, the synchronization signal, and the clock signal.

12 Claims, 7 Drawing Sheets

(56) References Cited

U.S. PATENT DOCUMENTS

| | | | |
|---|---|---|---|
| 8,233,092 B2 * | 7/2012 | Mino | 348/572 |
| 2001/0002842 A1 | 6/2001 | Ozawa | |
| 2002/0008776 A1 * | 1/2002 | Kuzumoto et al. | 348/468 |
| 2004/0070668 A1 | 4/2004 | Abe | |
| 2004/0095509 A1 | 5/2004 | Okamoto et al. | |
| 2004/0252235 A1 | 12/2004 | Ejima | |
| 2005/0093972 A1 * | 5/2005 | Higuchi | 348/71 |
| 2005/0243169 A1 | 11/2005 | Ono et al. | |
| 2006/0055793 A1 * | 3/2006 | Adler et al. | 348/211.99 |
| 2007/0146492 A1 * | 6/2007 | Choi | 348/211.99 |
| 2007/0153126 A1 * | 7/2007 | Sonobe | 348/537 |
| 2008/0122977 A1 * | 5/2008 | Miyamoto | 348/537 |
| 2008/0303921 A1 * | 12/2008 | Kim | 348/231.7 |
| 2009/0135262 A1 * | 5/2009 | Ogasawara | 348/211.4 |
| 2009/0216080 A1 * | 8/2009 | Nakamura | 600/109 |
| 2009/0290031 A1 * | 11/2009 | Nakamura et al. | 348/211.3 |
| 2009/0295450 A1 | 12/2009 | Sugita | |
| 2010/0007749 A1 * | 1/2010 | Azuma et al. | 348/211.2 |
| 2010/0013941 A1 * | 1/2010 | Berkey et al. | 348/211.1 |
| 2010/0020183 A1 * | 1/2010 | Kimoto et al. | 348/207.11 |
| 2010/0091128 A1 | 4/2010 | Ogasawara et al. | |
| 2010/0118158 A1 * | 5/2010 | Boland et al. | 348/211.2 |
| 2010/0158100 A1 | 6/2010 | Fukuda | |
| 2010/0296589 A1 | 11/2010 | Maeda | |
| 2011/0013078 A1 | 1/2011 | Shinozaki et al. | |

FOREIGN PATENT DOCUMENTS

| | | |
|---|---|---|
| JP | 10-178583 | 6/1998 |
| JP | 2005-311535 | 11/2005 |
| JP | 2008-062466 | 3/2008 |
| JP | 2008-137237 | 6/2008 |
| JP | 2008-193511 | 8/2008 |

OTHER PUBLICATIONS

U.S. Appl. No. 12/797,297, Non-Final Office Action, mailed Oct. 5, 2011.

U.S. Appl. No. 12/797,297, Final Office Action, mailed May 2, 2012.

* cited by examiner

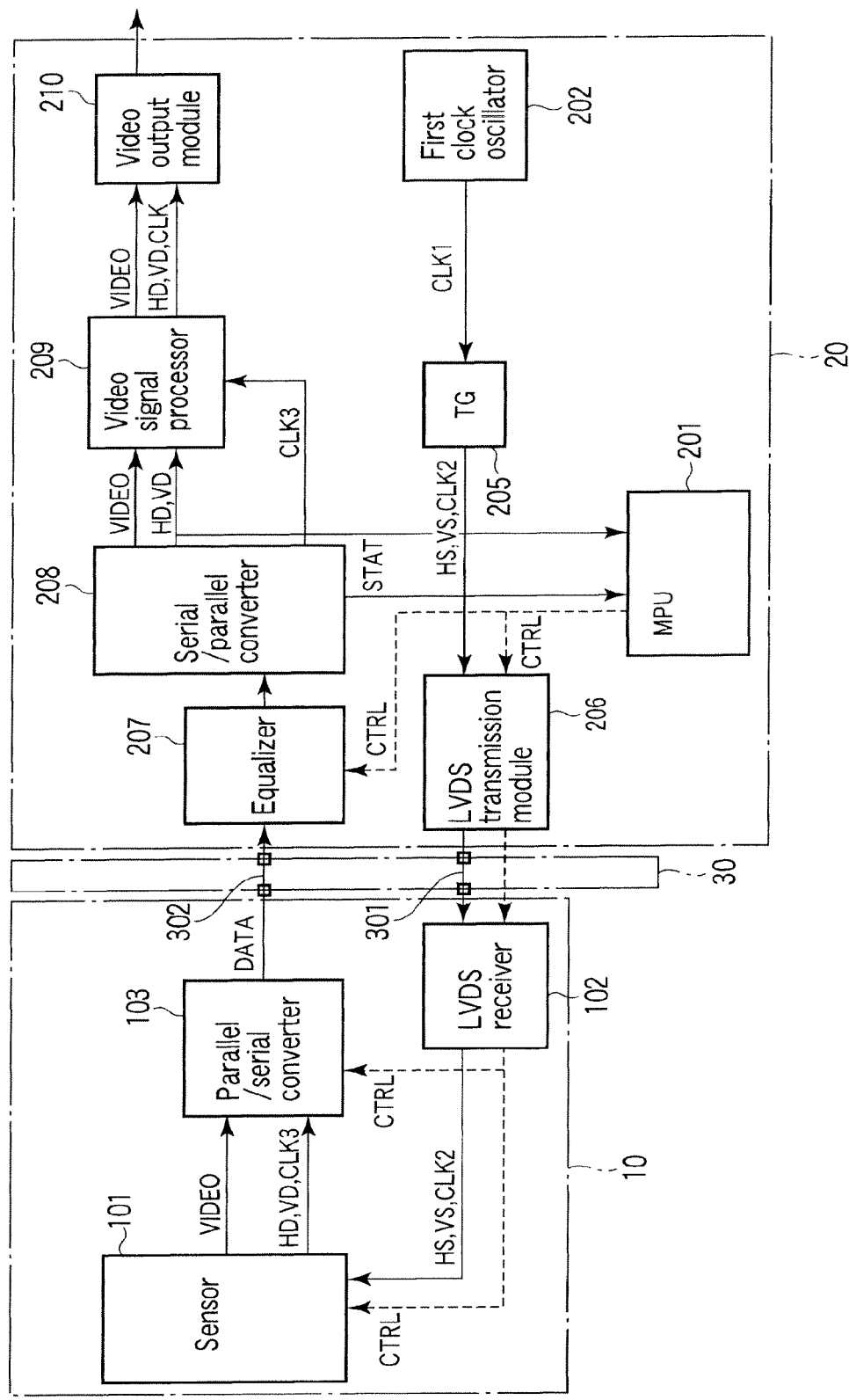
F I G. 2

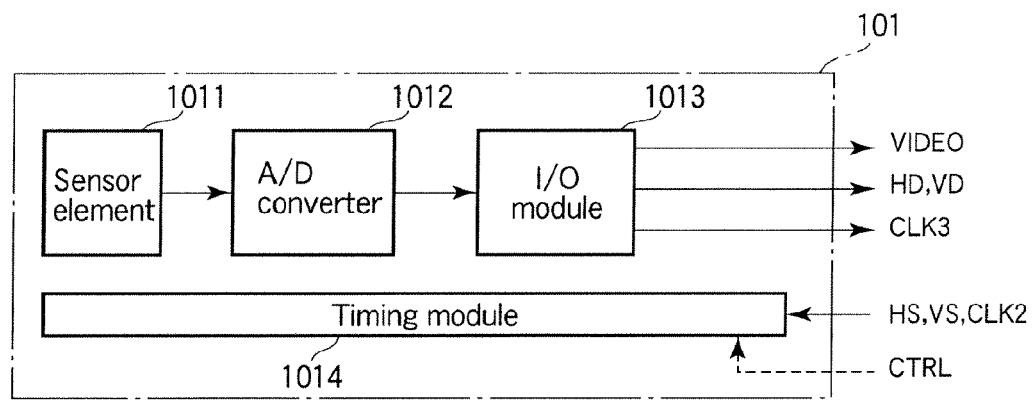
F I G. 3
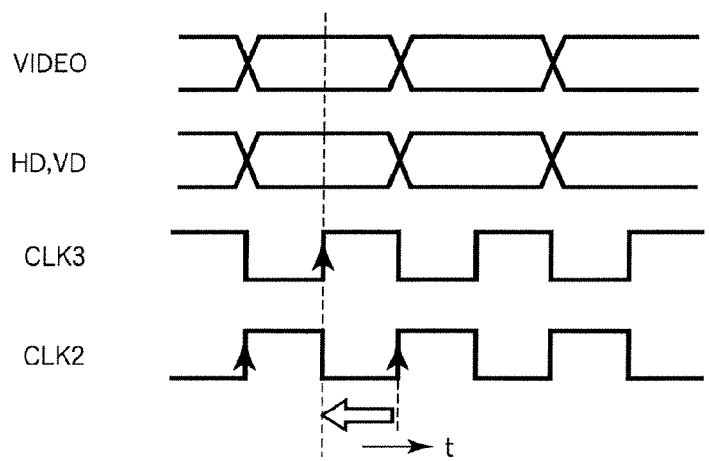
F I G. 4

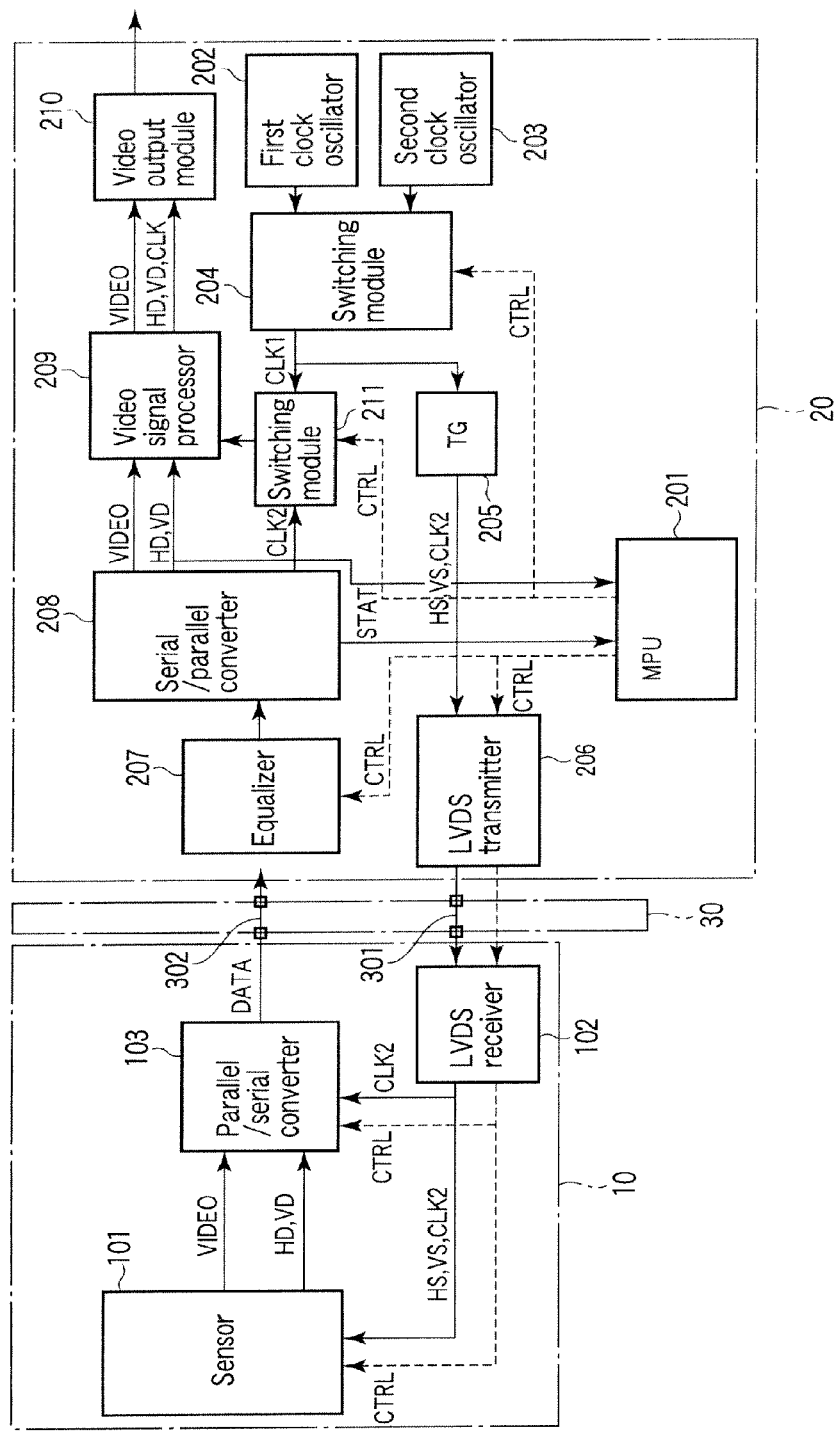
F I G. 7

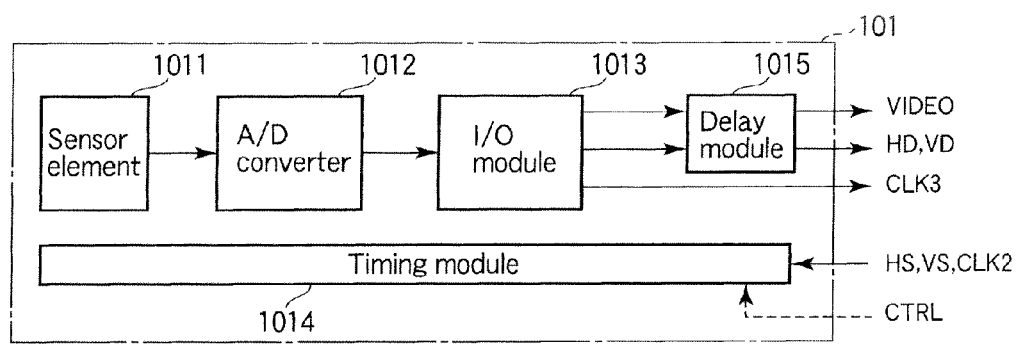
F I G. 9
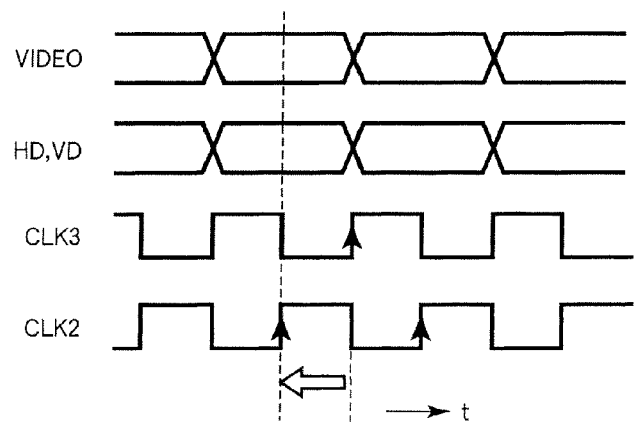
F I G. 10

HEAD-SEPARATED CAMERA DEVICE WITH SWITCHABLE CLOCKING

CROSS-REFERENCE TO RELATED APPLICATIONS

This application is continuation application that is based upon and claims the benefit of priority from U.S. application Ser. No. 12/797,297, now abandoned, which is based upon and claims the benefit of priority from Japanese Patent Application No. 2009-167085, filed Jul. 15, 2009; the entire contents of which are incorporated herein by reference.

FIELD

Embodiment described herein relate generally to a head-separated camera device in which an imaging unit and a control unit for controlling the imaging unit are separate from each other.

BACKGROUND

As is known well, a head-separated camera device is configured such that an imaging unit including a solid-state imaging element such as a complementary metal-oxide semiconductor (CMOS) sensor, and a control unit are constituted as separate members. The control unit supplies the solid-state imaging element of the imaging unit with a drive control signal and obtains a video signal by performing a signal processing on an output of the solid-state imaging element. The imaging unit and the control unit are connected through a cable which bundles plural signal lines.

In general, head-separated camera devices are developed for the purpose of, for example, inspecting narrow areas where people cannot enter in. Therefore, imaging elements thereof are demanded to be downsized as much as possible. Further, a cable which is used to connect the imaging unit and the control unit to each other is demanded to be long.

Jpn. Pat. Appln. KOKAI Publication No. 2005-311535 discloses a technique for receiving imaging data without a delay by a control unit in an imaging device comprising a pulse-delay detection unit and a phase-delay detection unit. The pulse-delay detection unit detects a delay amount from a time point when a control unit sends a control signal to a camera head unit to when the control signal returns to the control unit through the camera head unit. The phase-delay detection unit detects a phase difference between a clock signal generated by a timing generator provided in the camera head unit, and an imaging data signal based on a CCD.

BRIEF DESCRIPTION OF THE DRAWINGS

FIG. 2 is an exemplary block configuration diagram for describing an example modification to the signal processing system of the head-separated camera device according to the first embodiment of the invention;

FIG. 3 is an exemplary block diagram representing a configuraiton of a sensor unit according to the first embodiment of the invention in more details;

FIG. 4 is an exemplary waveform chart schematically representing timings of VIDEO, HD and VD, and CLK2 according to the first embodiment of the invention;

FIG. 7 is an exemplary block configuration diagram for describing a signal processing system according to a second embodiment of the invention;

FIG. 9 is an exemplary block diagram for describing a configuraiton of a sensor unit according to the second embodiment of the invention in more details; and FIG. 10 is an exemplary waveform chart schematically representing timings of VIDEO, HD and VD, and CLK2 according to the second embodiment of the invention.

DETAILED DESCRIPTION

In general, according to one embodiment, a head-separated camera device includes an imaging unit, a control unit configured to control the imaging unit, and a connection unit configured to connect the imaging unit with the control unit. The imaging unit includes a sensor configured to capture an image to provide a video signal, a synchronization signal, and a clock signal, a superimposition module configured to superimpose, on serial data, the video signal, the synchronization signal, and the clock signal, the serial data serving to reproduce the image captured by the sensor, and a transmitter configured to transmit the serial data to the control unit. The control unit includes a receiver configured to receive the serial data, a separation module configured to separate the serial data received by the receiver, into the video signal, the synchronization signal, and the clock signal, a video processor configured to perform a video processing by using the video signal, the synchronization signal, and the clock signal, and a timing signal generator configured to output, to the sensor, a sensor-driving synchronization signal and a sensor-driving clock signal.

Figure 1:
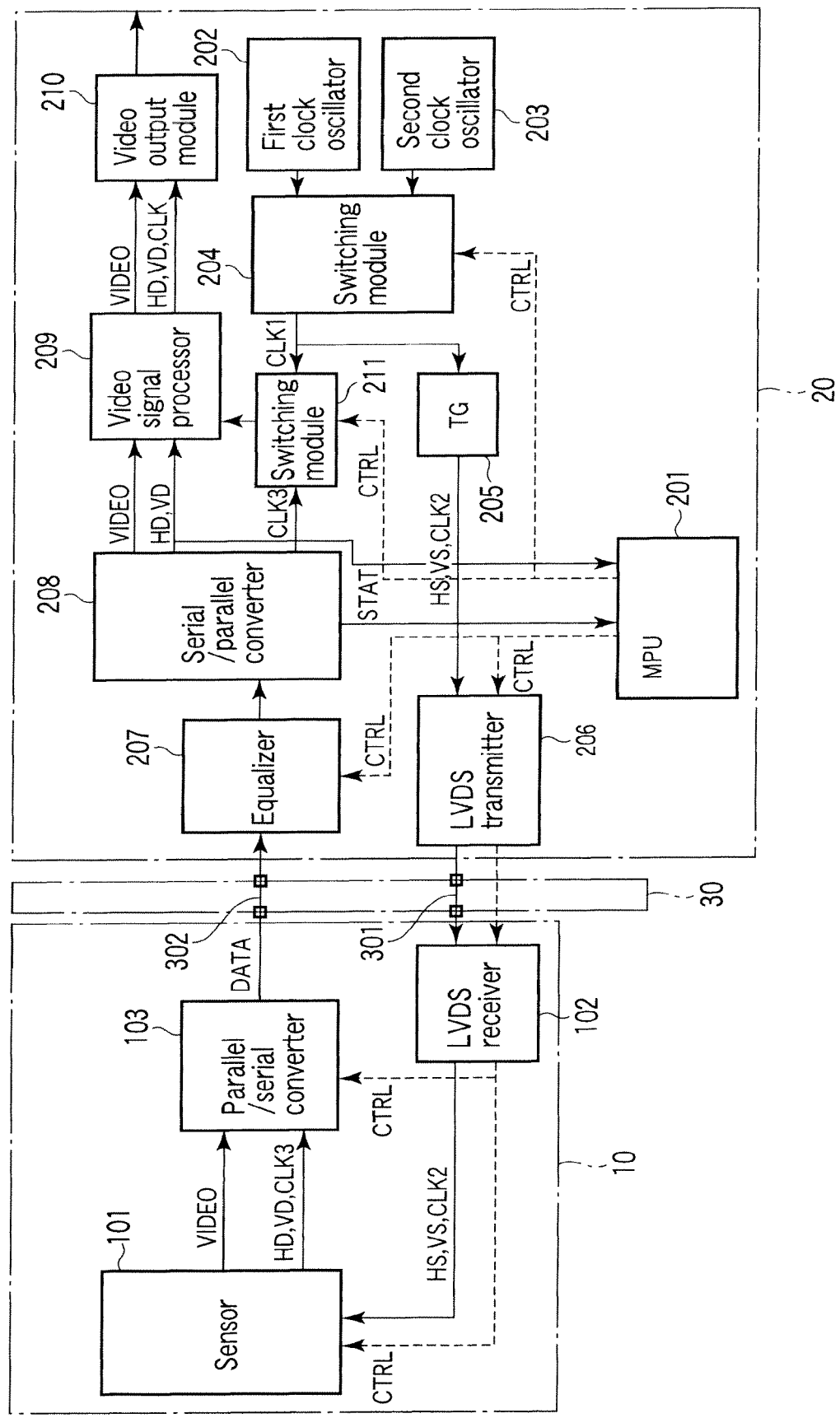
FIG. 1 is an exemplary block configuration diagram for describing a signal processing system of a head-separated camera device according to a first embodiment of the invention.

According to an embodiment, FIG. 1 represents a signal processing system of a head-separated camera device according to the first embodiment. Specifically, the head-separated camera device is configured to connect an imaging unit 10 and a control unit 20 by a camera cable 30.

The imaging unit 10 comprises a sensor 101, a paralell/serial converter 102 and a low voltage differential signaling (LVDS) receiver 103. The control unit 20 comprises a micro processing unit (MPU) 201, a first clock oscilator 202, a second clock oscilator 203, a switching module 204, a timing generator (TG: timining signal generator) 205, a LVDS transmitter 206, an equalizer 207, a serial/parallel converter 208, a video signal processor 209, a video output module 210, and a switching module 211. The MPU 201 receives operation information externaly supplied from a user, and controls the imaging unit 10 and respective units constituting the control unit 20 so as to reflect the operation information. Broken lines in FIG. 1 express three-line-serial-type control (CTRL) lines of the MPU 201.

Operation of respective units will now be described along signal flow. At frist, the first clock oscillator 202 oscillates a clock signal having a predetermined pulse characteristic. The second clock oscilator 203 oscillates a clock signal having a different pulse characteristic from that of the pulse characteristic of the first clock oscilator 202. Under control of the MPU 201, the switching module 204 supplies the TG 205 with a first clock signal (CLK1), by switching a clock signal oscillated by the first clock oscilator 202 and a clock signal oscillated by the second clock oscilator 203 from each other, as the CLK1. At least one of the first clock oscilator 202 or the second clock oscilator 203 may be provided in the control unit 20. The number of the clock oscilator may be increased depending on types of video outputs.

The TG 205 generates a drive control timing for the sensor 101 on the basis of the CLK1. The TG 205 generates a horizontal synchronization signal (HS), a vertical synchronization signal (VS), and a second clock signal (CLK2) for driving the sensor 101. Although the TG 205 is provided in the control unit 20 in view of downsizing of the imaging unit 10, the TG 205 may be provided in the imaging unit 10.

Under control of the MPU 201, the LVDS transmitter 206 supplies the LVDS receiver 102 of the imaging unit 10 with the HS, VS, and CLK2 through a control signal cable 301. Although the LVDS transmitter 206 and LVDS receiver 102 are used to transfer the HS, VS, and CLK2 at a high speed, any other interface may be used instead.

Under control of the MPU 201, the LVDS receiver 102 suppliseds the sensor 101 with the HS, VS, and CLK2. The sensor 101 includes, for example, a digital sensor such as a CMOS sensor. Based on the HS, VS, and CLK2, the sensor 101 converts an optical image formed on a light receiving surface of the sensor 101 into a corresponding video signal (VIDEO), a horizontal video synchronization signal (HD), and a third clock signal (CLK3) to recover optical image, and supplies the signals. The VIDEO, HD, and VD are sensor output signals.

Under control of the MPU 201, the parallel/serial converter 103 mixes and converts the VIDEO, HD, VD, and CLK3 into superimposed serial data. The parallel/serial converter 103 simultaneously transmits the CLK3 and the sensor output signals, with the sensor output signals embedded in the CLK3. The parallel/serial converter 103 supplies the equalizer 207 of the control unit 20 with the serial data through the data signal cable 302. The parallel/serial converter 103 also functions as a transmission module. Under control of the MPU 201, the equalizer 207 amplifies the serial data. In this embodiment, a serializer as the parallel/serial conversion unit 103, a deserializer as the serial/parallel conversion unit 208, and the equalizer 207 in a front side of the deserializer are provided. However, the equalizer 207 may be unused.

The serial/parallel converter 208 separates the serial data amplified by the equalizer 207 into parallel data conisitng of VIDEO, HD, VD, and CLK3. The serial/parallel converter 208 also functions as a receiving module. The serial/parallel converter 208 supplies the video signal processing unit 209 with the VIDEO, HD, and VD. The serial/parallel converter 208 supplies the switching module 211 with the CLK3. Under control of the MPU 201, the switching module 211 supplies the video signal processor 209 with the CLK1 or CLK3, switching adequately the CLK1 and the CLK3 from each other. In this embodiment, the signal supplied to the video signal processor 209 is referred to as CLK. The switching module 211 functions to keep outputting the video when the imaging unit 10 separates from the control unit 20.

The video signal processor 209 performs a preset predetermined signal processing on the VIDEO, HD, VD, and CLK. The video signal processor 209 supplies the video output module 210 with the VIDEO, HD, VD, and CLK subjected to the signal processing. The video output module 210 converts the VIDEO, HD, VD, and CLK into a video signal according to a predetermined standard, and outputs an image to an unillustrated monitor.

FIG. 2 represents an example modification to the head-separated camera device according to the first embodiment. As represented in FIG. 2, the head-separated camera device may be simplified by omitting the second clock oscillator 203, switching module 204, and switching module 211 from FIG. 1. The control unit 20 may be provided with the first clock oscillator 202 of one type. The first clock oscillator 202 directly supplies the TG 205 with the CLK1.

FIG. 3 is a block diagram for describing the configuration of the sensor 101 in more details. The sensor 101 comprises a sensor element 1011, an analog/digital (A/D) converter 1012, an input/output (I/O) module 1013, and a timing controller 1014. The sensor 101 forms an image on a light receiving surface of an incident optical image of a subject. The A/D converter 1012 converts the optical image into a digital video signal corresponding to the optical image. The I/O module 1013 latches the VIDEO, HD, and VD with use of the clock signal, and supplies the parallel/serial conversion unit 103 with the latched signals through different signals lines. The timing controller 1014 supplies a clock signal to the sensor element 1011, A/D conversion unit 1012, and I/O 1013.

FIG. 4 is a waveform chart schematically representing timings of the VIDEO, HD and VD, and CLK3 which are output from the sensor 101, and timings of the CLK2 which is input to the sensor 101. The VIDEO, HD and VD, and CLK3 delay from the CLK2 and have phases shifted from the phase of the CLK2. On the other sides, the VIDEO, HD and VD, and CLK3 are signals all output from the sensor element 1011 and therefore have phases aligned with each other.

According to the first embodiment, the imaging unit 10 can transfer the VIDEO and CLK3 to the control unit 10 through one identical channel, and the number of cores of the data signal cable 302 can be therefore reduced.

According to the first embodiment, signal processing is performed by the video signal processor 209 in the control unit 20, with use of the VIDEO, HD and VD, and CLK3 having phases aligned with each other. Therefore, no disturbance is caused in images output from the video outputmodule 210. Also according to the first embodiment, images are output shifted from a drive timing generated by the TG 205 but do not involve any problem because only display timings delay as a whole.

Figure 5:
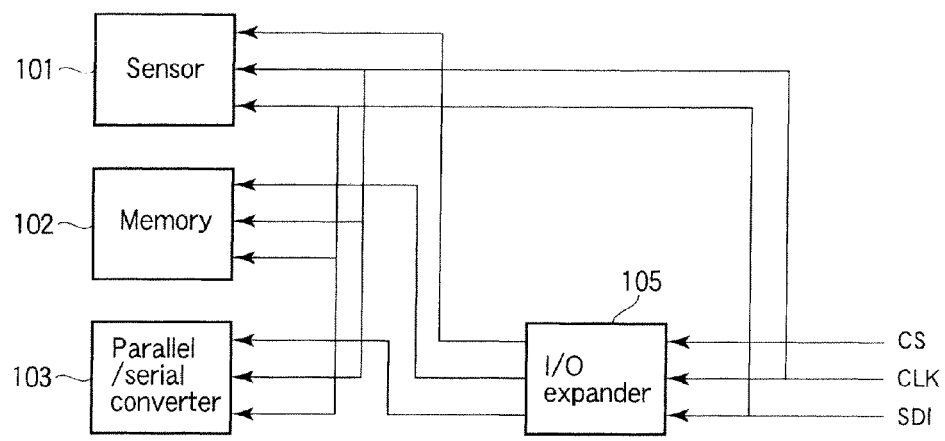
FIG. 5 is an exemplary block diagram representing an example of control of a device constituting part of an imaging unit according to the first embodiment of the invention.

FIG. 5 is a block diagram representing an example of control of devices constituting the imaging unit 10. This figure relates to an example in which an electrically erasable programmable read-only memory (EEPROM) is provided as the memory 104 in the imaging unit 10. The memory 104 need not always be provided in the imaging unit 10. As represented in FIG. 1, drive signals for controlling the imaging unit 10 are of three types, i.e., HS, VS, and CLK. Control signals between the imaging unit 10 and the control unit 20 are of four types, i.e., a select signal (CS), a clock signal (CLK), a data input signal (SDI), and a data output signal (SDO). In this case, the SDI is input to the I/O expander 105. The I/O expander 105 can branch and control plural device select signals and reset signals. Further, a video signal (Video (for example, parallel 12-bit), HD, VD, and CLK) transmitted from the imaging unit 10 to the control unit 20 is serialized into 4 channels at most. The bit rate of the Video may alternatively be 14-bit or 24-bit and is not particularly limited.

Therefore, differential signals (LVDS) are 11 pairs in total. A general-purpose Power Over Camera Link standard cable is available as a camera cable 30. This cable consists of 11 pairs of 22 electric lines for differential signals, two electric lines for power supply, and two electric lines for GND, and so can be used as the camera cable 30. Accordingly, a low-price head-separated camera device can be supplied for users. Further, a narrow and soft camera cable 30 can be used for the head-separated camera device if the number of cores of the camera cable 30 is reduced.

Described next will be a transmission method for transferring serial data from the imaging unit 10 to the control unit 20. The imaging unit 10 converts serial data into differential signals on several pairs of channels (maximum 4 channels in the first embodiment), and then transfers the differential signals to the control unit 20 through a signal cable 302. The MPU 201 switches the number of channels to be used for transfer from the imaging unit 10 to the control unit 20, depending on resolution of the sensor unit 101. If the transfer rate changes depending on resolution of the sensor 101, the MPU 201 can change the clock frequency of CLK which is input to the serial/parallel converter 103. Accordingly, power consumption can be reduced. For example, if the resolution is 1080p, the frequency band is 148 MHz. Alternatively, if the resolution is 720p, the frequency band is 74 MHz.

Figure 6A:
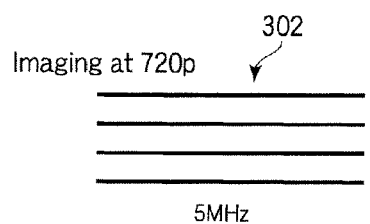
FIG. 6A represents an example of transferring serial data on 4 channels at 5 MHz.
Figure 6C:
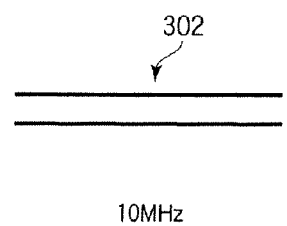
FIG. 6C represents an example of transferring serial data on 2 channels at 10 MHz.
Figure 6B:
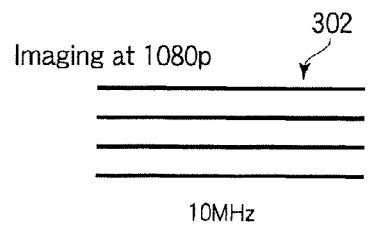
FIG. 6B represents an example of transferring serial data on 4 channels at 10 MHz.
Figure 6D:
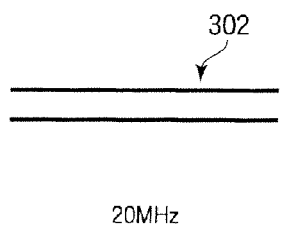
FIG. 6D is an example of transferring serial data on 2 channels at 20 MHz.

FIGS. 6A, 6B, 6C and 6D are for schematically describing the transmission method for transferring serial data from the imaging unit 10 to the control unit 20. FIG. 6A represents an example of transferring serial data on 4 channels at 5 MHz. FIG. 6B represents an example of transferring serial data on 4 channels at 10 MHz. FIG. 6C represents an example of transferring serial data on 2 channels at 10 MHz. FIG. 6D is an example of transferring serial data on 2 channels at 20 MHz.

Transfer channels have a frequency characteristic that the lower the frequency at which serial data is transferred is, the less the waveform of a transfer signal deteriorates, i.e., the longer the transfer distance is. In case where an equal amount of data is transferred, signal degradation on transfer channels can be more prevented by transfer on condition of FIG. 6A (or FIG. 6B) than on condition of FIG. 6C (of FIG. 6D). When performing parallel/serial conversion in the transmitting side and serial/parallel conversion in the receiving side, a transfer clock signal, which is a multiple in n-number system with respect to a clock signal as a reference, is generated, and a clock signal having the same frequency as an original clock signal is generated from the generated transfer clock signal. At this time, circuit operation would be more stable when the transfer frequency per channel is as uniform as possible. In case where two different amounts of data are transferred through one identical transfer channel, circuit operation is more stable when a half of the amount of data represented in FIG. 6B is transferred on the condition of FIG. 6C than on the condition of FIG. 6A.

Next, the second embodiment will be described. FIG. 7 represents a signal processing system of a head-separated camera according to the second embodiment. The same parts as those in the first embodiment will be denoted at the same reference symbols, and a detailed description thereof will be omitted herefrom. According to the second embodiment, a LVDS receiver 102 supplies a parallel/serial converter 103 with CLK2. Under control of a MPU 201, the parallel/serial converter 103 mixes VIDEO, HD, and VD output from a sensor 101 with the CLK2 supplied from a LVDS receiver 102, and converts the mixed signals into serial data, in order to recover an optical image. That is, the second embodiment differs from the first embodiment in that a sensor output signal is serialized by using the CLK2 generated by a TG 205, as a clock signal for sensor driving.

Figure 8:
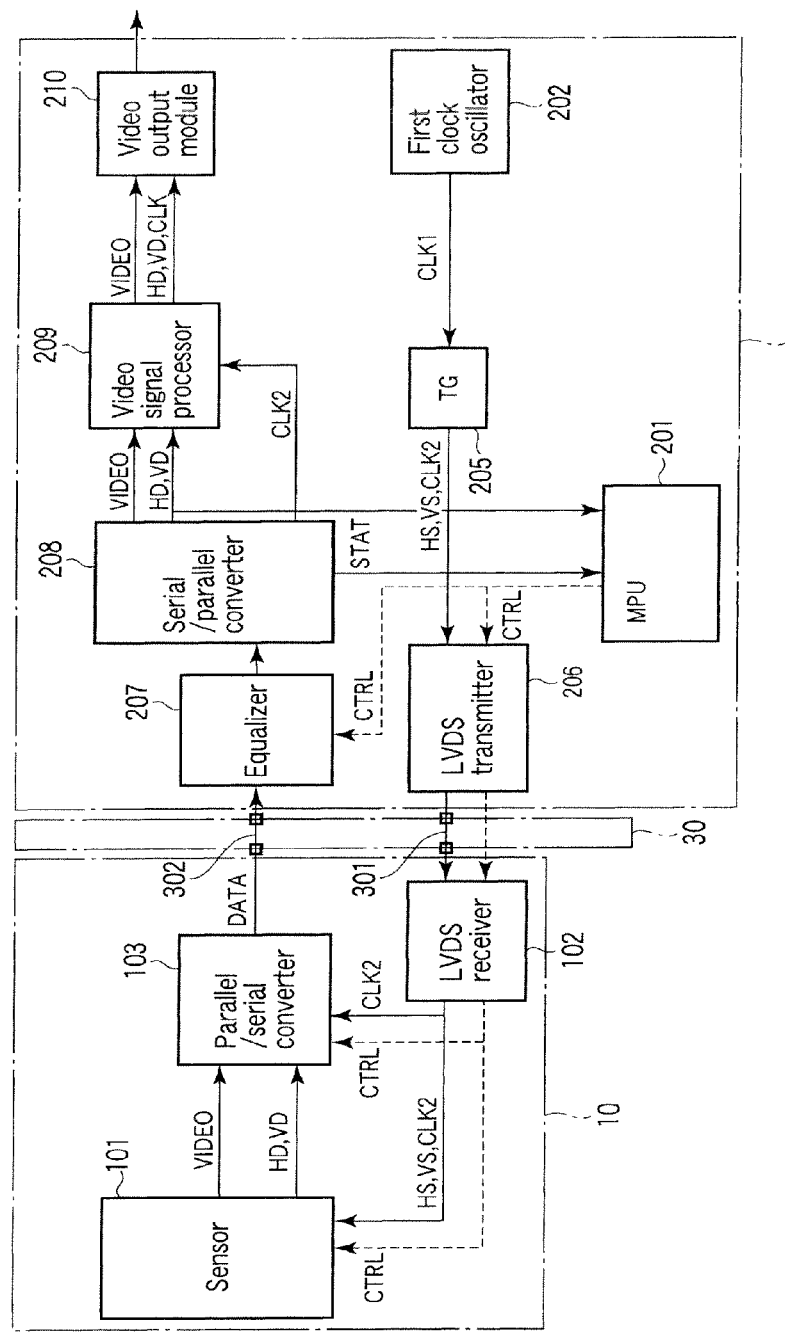
FIG. 8 is an exemplary block configuration diagram for describing an example modification to a signal processing system of a head-separated camera device according to the second embodiment of the invention.

FIG. 8 represents an example modification to the head-separated camera according to the second embodiment. As represented in FIG. 8, the head-separated camera may be simplified by omitting a second clock oscillator 203, a switching module 204, and a switching module 211 from FIG. 7. A control unit 20 need only be provided with a first clock oscillator 202 of one type. The first clock oscillator 202 directly supplies the TG 205 with a CLK 1.

FIG. 9 is a block diagram for describing a configuration of the sensor 101 according to the second embodiment in more details. The same parts as those in the first embodiment will be denoted at the same reference symbols, and a detailed description thereof will be omitted herefrom. In the second embodiment, a delay module 1015 is provided in a rear side of an I/O module 1013. The delay module 1015 is a circuit which is constituted, for example, by a delay element. Under control of the MPU 201, the delay module 1015 adjusts setup/hold time so as to delay the sensor output signal by CLK/n.

FIG. 10 is a waveform chart which schematically represents timings of the VIDEO, HD and VD output from the sensor 101 and timings of the CLK2 input to the parallel/serial converter 103. The VIDEO, HD, and VD are delayed, by a predetermijned timing, by the delay module 105, and are thereby aligned with a phase of the CLK2.

The imaging unit 10 transmits serial data to the control unit 20 by using CLK for sensor driving, which is generated by the TG 205. Therefore, the head-separated camera device according to the second embodiment can constitute a digital transfer system which is independent from CLK jitter performance of the sensor unit 101. Further, the transfer distance can be extended with the VIDEO, HD and VD, and CLK 2 stabled.

While certain embodiments s have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. Any disclaimer of claim scope in the parent application is or the prosecution history thereof now rescinded and the claims in this application may be broader than any claim in the parent application.

What is claimed is:

1. A head-separated camera device comprising an imaging unit, a control unit configured to perform a video processing to a video signal captured by the imaging unit, and a connection unit configured to connect the imaging unit with the control unit, wherein the control unit comprises
a timing signal transmitter configured to output a clock signal to the imaging unit; and
a switching module configured to switch a clock signal used for outputting video from (i) a clock signal supplied from the imaging unit to (ii) the clock signal supplied from the timing signal transmitter when the imaging unit separates from the control unit;

the imaging unit comprises
a receiver configured to receive and directly distribute the clock signal supplied from the control unit;

a sensor configured to capture a digital image by using the clock signal supplied from the control unit through the receiver and output a digital video signal based on the image; and a transmitter configured to superimpose, on serial data, the digital video signal captured by the sensor and the clock signal supplied from the control unit through the receiver and to transmit the serial data.

2. The device of claim 1, wherein the imaging unit comprises a delay module configured to delay the video signal output from the sensor to match a phase of the video signal output from the sensor with a phase of the clock signal.

3. The device of claim 1, wherein the transmitter is configured to transmit the serial data through a transfer line including one channel or a plurality of channels.

4. The device of claim 3 wherein the transmitter is configured to switch a number of channels to be used, depending on a transfer rate.

5. The device of claim 1 wherein the timing signal transmitter comprises
   a first clock generator configured to generate a first clock signal;
   a second clock generator configured to generate a second clock signal; and
   a switching module configured to supply the first clock signal or the second clock signal by switching between the first clock signal and the second clock signal.

6. The device of claim 1, wherein the connection unit is configured to adopt a cable according to a Power Over Camera Link standard.

7. The device of claim 1, wherein the receiver of the imaging unit receives and directly distributes the clock signal supplied from the control unit without processing so that the clock signal used by the sensor is identical to the clock signal received by the receiver.

8. An imaging method of a head-separated camera device comprising an imaging unit, a control unit configured to perform a video processing to a digital video signal captured by the imaging unit and a connection unit configured to connect the imaging unit with the control unit, the method comprising:
   outputting a clock signal from the control unit;
   receiving, by a receiver, the clock signal supplied from the control unit and directly distributing the clock signal supplied from the control unit to a sensor and a transmitter at the imaging unit;
   capturing, by the sensor, a digital image by using the clock signal supplied from the control unit through the receiver and outputting the digital video signal based on the image;
   superimposing, by the transmitter, on serial data, the digital video signal image captured by the sensor and the clock signal supplied from the control unit through the receiver and transmitting the serial data;
   performing a video processing by the control unit; and
   switching a clock signal used for outputting video from a clock signal supplied from the imaging unit to a clock signal supplied from the control unit when the imaging unit separates from the control unit.

9. The method of claim 8, comprising:
   delaying, by a delay module, the video signal output from the sensor to match a phase of the video signal output from the sensor with a phase of the clock signal.

10. The method of claim 8, comprising:
    transmitting, by the transmitter, the serial data through a transfer line including one channel or a plurality of channels.

11. The method of claim 10, comprising:
    switching, by the transmitter, a number of channels to be used, depending on a transfer rate.

12. The method of claim 8, wherein the receiver distributes the clock signal identical to the clock signal received from the control unit.

\* \* \* \* \*